US005866266A

United States Patent [19]

Takasu

[11] Patent Number: 5,866,266

[45] Date of Patent: Feb. 2, 1999

[54] RADIATION IMAGE STORAGE PANEL AND ITS PREPARATION

[75] Inventor: Atsunori Takasu, Kanagawa, Japan

[73] Assignee: Fuji Photo Film Co., Ltd., Kanagawa, Japan

[21] Appl. No.: 834,772

[22] Filed: Apr. 3, 1997

Related U.S. Application Data

[63] Continuation of Ser. No. 582,502, Jan. 3, 1996, abandoned.

[30] Foreign Application Priority Data

Jan. 5, 1995 [JP] Japan .................................... 7-015506

[51] Int. Cl.$^6$ .......................................................... B32B 9/00

[52] U.S. Cl. ............................ 428/690; 428/421; 427/65; 427/157; 250/483.1

[58] Field of Search .................................... 428/690, 704, 428/421; 427/65, 157; 250/483.1

[56] References Cited

U.S. PATENT DOCUMENTS

| | | | |
|---|---|---|---|
| 5,227,253 | 7/1993 | Takasu et al. | 428/690 |
| 5,401,971 | 3/1995 | Roberts | 250/484.4 |

FOREIGN PATENT DOCUMENTS

| | | |
|---|---|---|
| A-0 579 016 | 1/1994 | European Pat. Off. . |
| 2193100 | 2/1990 | Japan . |
| WO-A-96 11481 | 4/1996 | WIPO . |

*Primary Examiner*—Charles Nold
*Attorney, Agent, or Firm*—Sixbey, Friedman, Leedom & Ferguson, P.C.; Gerald J. Ferguson, Jr.

[57] ABSTRACT

In a radiation image storage panel comprising a stimulable phosphor layer and a protective film placed thereon, the protective film is made of a film of plastic material and a layer of a fluororesin-containing resin composition coated on the phosphor layer. The coated layer is prepared by coating a solution of a resin composition containing not less than 30 weight % of a fluororesin and drying thus coated solution layer.

11 Claims, 1 Drawing Sheet

RADIATION IMAGE STORAGE PANEL AND ITS PREPARATION

This application is a Continuation of Ser. No. 08/582,502, filed Jan. 3, 1996, now abandoned.

FIELD OF THE INVENTION

The present invention relates to a radiation image storage panel using a stimulable phosphor.

BACKGROUND OF THE INVENTION

As a method replacing a conventional radiography, a radiation image recording and reproducing method utilizing a stimulable phosphor as described, for instance, in U.S. Pat. No. 4,239,968, was proposed and has been practically employed. In the method, a radiation image storage panel comprising a stimulable phosphor (i.e., stimulable phosphor sheet) is employed, and the method involves the steps of causing the stimulable phosphor of the storage panel to absorb radiation energy having passed through an object or having radiated from an object; sequentially exciting the stimulable phosphor with an electromagnetic wave such as visible light or infrared rays (hereinafter referred to as"estimulating rays") to release the radiation energy stored in the phosphor as light emission (i.e., stimulated emission); photoelectrically detecting the emitted light to obtain electric signals; and reproducing the radiation image of the object as a visible image from the electric signals. The radiation image storage panel thus treated is subjected to a step for erasing a radiation image remaining therein, and then is stored for the next radiation image recording and reproducing procedure. Thus, the radiation image storage panel is repeatedly employed.

In the radiation image recording and reproducing method, a radiation image is obtainable with a sufficient amount of information by applying a radiation to an object at a considerably smaller dose, as compared with the conventional radiography using a combination of a radiographic film and radiographic intensifying screen. Further, the radiation image recording and reproducing method using a stimulable phosphor is of great value especially when the method is employed for medical diagnosis. Furthermore, the radiation image recording and reproducing method is advantageous in saving resources and economical efficiency, as compared with the conventional radiography, because the radiation image storage panel is repeatedly employed, while a radiographic film is employed only for one shot.

The radiation image storage panel employed in the above-described method has a basic structure comprising a support and a stimulable phosphor layer provided on one surface of the support. If the phosphor layer is selfsupporting, however, the support may be omitted.

The stimulable phosphor layer generally comprises stimulable phosphor particles and a binder. Stimulable phosphor layers of other types are also known. For instance, a stimulable phosphor layer comprising agglomerated stimulable phosphor particles and no binder can be prepared by a sintering method or a vacuum deposition method. The agglomerated stimulable phosphor layer can contain a polymer, if desired. Any of radiation image storage panels having these stimulable phosphor layers can be employed in the above-described radiation image recording and reproducing method.

Further, a transparent film of polymer material is generally provided on the free surface (surface not facing the support) of the phosphor layer to keep the phosphor layer from chemical deterioration or physical shock. The protective film can be provided, for instance, by coating a solution of a transparent organic polymer such as a cellulose derivative or polymethyl methacrylate on the phosphor layer, by fixing a beforehand prepared polymer film such as a polyethylene terephthalate film on the phosphor layer with an adhesive, or by vacuum depositing inorganic material on the phosphor layer.

The coated protective layer can be readily prepared by coating a solution of polymer material on the phosphor layer, and the coated protective layer is firmly fixed on the phosphor layer.

In the radiation image recording and reproducing method, the radiation image storage panel is repeatedly employed in the steps of radiation of X-rays (recording of radiation image), irradiation of stimulating rays (reading out of the recorded radiation image), and exposure to erasing light (erasure of residual radiation image). Between these steps, the storage panel is transferred by conveyors such as belts and/or rollers within the apparatus for performing the radiation image recording and reproducing method. When these steps are repeated, the coated protective layer of the storage panel is apt to be stained or to receive abrasions or scratches on its surface. The stains, abrasions, and/or scratches produced on the surface of the protective layer causes deterioration of image quality of a reproduced radiation image. The radiation image storage panel naturally is desired to give a reproduced radiation image of high quality (such as high sharpness and improved graininess). Therefore, the production of stains, abrasions and scratches on the surface of the protective layer should be avoided.

Japanese Patent Provisional Publication No. 2(1990)-193100 (corresponding to U.S. patent application Ser. No. 07/704,738) describes a protective film of a fluororesin which is soluble in an organic solvent and is coated on a stimulable phosphor layer of a radiation image storage panel. The protective film of a fluororesin can effectively reduce the production of stains, abrasions and scratches.

U. S. Pat. No. 5,227,253 discloses a radiation image storage panel having a protective film which is produced from a mixture of a film-forming resin (such as a fluororesin) and an oligomer having a polysiloxane skeleton or a perfluoroalkyl group. The protective film of a mixture of the fluororesin and others can more effectively reduce the production of stain, abrasions and scratches.

SUMMARY OF THE INVENTION

It has been found that the protective layer of a fluororesin or a mixture of a fluororesin and an oligomer having a polysiloxane skeleton or a perfluoroalkyl group, which is coated on the stimulable phosphor layer, shows high anti-staining, anti-abrasion and anti-scratch properties but is relatively brittle so as to sometimes produce cracks therein. The radiation image storage panel having a cracked protective layer cannot give a reproduced radiation image of high quality, because X-rays or stimulating rays impinged on the cracked protective layer are scattered on the cracks.

Accordingly, it is an object of the invention to provide a radiation image storage panel having not only the favorable anti-staining, anti-abrasion and anti-scratch properties but also sufficient physical strength to keep the protective film from production of cracks.

The present invention resides in a radiation image storage panel comprising a stimulable phosphor layer and a protective film placed thereon, wherein the protective film comprises a film of plastic material and a layer of a fluororesin-containing resin composition coated thereon, said coated layer having been prepared by coating on the film of plastic material a solution of a resin composition containing not less than 30 weight % of a fluororesin and drying thus coated solution layer. The resin composition preferably contains the fluororesin not less than 50 weight %, more preferably not less than 70 weight %.

Preferably, the resin composition of the radiation image storage panel of the invention further contains 0.01 to 10 weight % of an oligomer having polysiloxane structure or 0.1 to 3 weight % of an oligomer having a perfluoroalkyl group.

More preferably, the resin composition comprises a fluororesin and 0.01 to 10 weight % of an oligomer having polysiloxane skeleton or 0.1 to 3 weight % of an oligomer having a perfluoroalkyl group.

The oligomer having polysiloxane skeleton preferably has at least one functional group such as a hydroxyl group in its molecular structure. The oligomer having a perfluoroalkyl group also preferably has at least one functional group such as a hydroxyl group in its molecular structure.

The resin composition may further contain a perfluoroolefin powder or a silicon powder in an amount of 0.5 to 30 weight %. The perfluoroolefin or silicon powder preferably has a mean diameter of 0.1 to 10 $\mu$m.

The coated layer of the radiation image storage panel of the invention preferably is of a crosslinked structure. The crosslinked structure is preferably produced using an isocyanate resin or an amino resin.

DETAILED DESCRIPTION OF THE INVENTION

Figure 1:
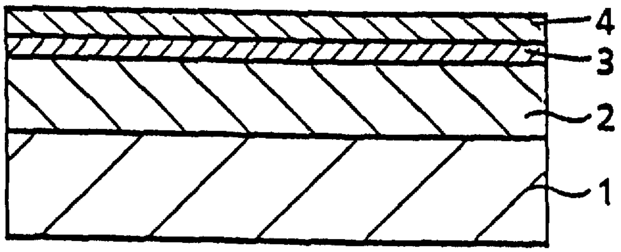
FIG. 1 shows a schematic section of a representative radiation image storage panel of the invention.

One representative structure of the radiation image storage panel of the invention is illustrated in FIG. 1, which comprises a support sheet 1, a stimulable phosphor layer 2, a protective film 3, and a coated resin composition layer 4.

Details of the radiation image storage panel of the invention and the process for its preparation are described below.

The stimulable phosphor gives a stimulated emission when it is irradiated with stimulating rays after it is exposed to radiation. In the preferred radiation image storage panel, a stimulable phosphor giving a stimulated emission of a wavelength in the range of 300 to 500 nm when it is irradiated with stimulating rays of a wavelength in the range of 400 to 900 nm is employed. Examples of the preferred stimulable phosphors include divalent europium activated alkaline earth metal halide phosphors and a cerium activated alkaline earth metal halide phosphors. Both stimulable phosphors favorably give the stimulated emission of high luminance. However, the stimulable phosphors employable in the radiation image storage panel of the invention are not limited to the above-mentioned preferred stimulable phosphors.

The stimulable phosphor layer can be prepared using no binder polymer. For instance, the stimulable phosphor layer can be formed of aggregated phosphor particles which may be impregnated with an organic polymer. Otherwise, the stimulable phosphor layer can be formed on a support by vacuum deposition.

The following shows a process for preparing a stimulable phosphor layer comprising stimulable phosphor particles and a binder polymer.

The stimulable phosphor particles and the binder polymer are well mixed in an appropriate solvent to give a coating dispersion in which the phosphor particles are uniformly dispersed in the binder solution. Examples of the binder polymers include natural polymer materials such as proteins (e.g., gelatin), polysaccharides (e.g., dextran), and gum arabic, and synthetic polymer materials such as polyvinyl butyral, polyvinyl acetate, nitrocellulose, ethyl cellulose, vinylidene chloride-vinyl chloride copolymer, polyalkyl (meth)acrylate, vinyl chloride-vinyl acetate copolymer, polyurethane, cellulose acetate butyrate, polyvinyl alcohol and linear polyester. These binder polymers can be used singly or in combination. Preferred are nitrocellulose, linear polyester, polyalkyl (meth)acrylate, polyurethane, a mixture of nitrocellulose and linear polyester, and a mixture of nitrocellulose and polyalkyl (meth)acrylate.

Examples of the solvents for the preparation of a phosphor layer-forming coating dispersion include lower alcohols such as methanol, ethanol, n-propanol, and n-butanol, chlorine atom-containing hydrocarbons such as methylene chloride and ethylene chloride, ketones such as acetone, methyl ethyl ketone, and methyl isobutyl ketone, esters of lower carboxylic acids and lower alcohols such as methyl acetate, ethyl acetate and butyl acetate, ethers such as dioxane, ethylene glycol monoethyl ether, ethylene glycol monomethyl ether, and tetrahydrofuran, and mixtures of two or more of these solvents.

In the coating dispersion, the binder polymer and the stimulable phosphor are introduced generally at a ratio of 1:1 to 1:100 (binder:phosphor, by weight), preferably 1:8 to 1:40 (by weight). The ratio can be varied depending the desired characteristics of the storage panel and natures of the binder polymers and phosphors.

The coating dispersion may contain additives such as a dispersant (which increases dispersibility of the phosphor in the binder polymer solution) and a plasticizer (which increase adhesion between the binder polymer and the phosphor particles in the phosphor layer).

The coating dispersion of the phosphor and binder polymer in the solvent is then coated uniformly on a support sheet to form a coated layer on the support. The coating can be performed by known coating means such as doctor blade, roll coater, and knife coater.

The support can be optionally selected from the known materials employed for the conventional radiation image storage panel. Examples of the known materials include films of plastic materials such as cellulose acetate, polyester (e.g., polyethylene phthalate), polyamide, polyimide, cellulose triacetate, and polycarbonate, metal sheets such as aluminum sheet and aluminum alloy sheet, ordinary paper, baryta paper, resin-coated paper, pigment paper containing a pigment (e.g., titanium dioxide), paper sized with polyvinyl alcohol or the like, and sheets of ceramics such as alumina, zirconia, magnesia and titania.

Some of the known radiation image storage panels have various auxiliary layers: for instance, an adhesive layer which is formed of a polymer material such as gelatin or an acrylic resin on the support and which enhances strength between the support and the phosphor layer or increases sensitivity or image quality (e.g., sharpness and graininess) of the obtainable radiation image; a light-reflecting layer of a light reflecting material such as titanium dioxide; and a light-absorbing layer of a light-absorbing material such as carbon black. The radiation image storage panel of the invention may have one or more of such auxiliary layers.

Further, the support of the radiation image storage panel of the invention may have a great number of a very small convexes or concaves on its surface. If the support is coated with one or more auxiliary layers, the convexes or concaves may be formed on these layers. The great number of very small convexes or concaves can improve sharpness of the radiation image reproduced by the use of the storage panel.

The coated phosphor layer is then dried to give the desired stimulable phosphor layer. The stimulable phosphor layer generally has a thickness of 20 μm to 1 mm, preferably 50 to 500 μm. The thickness of the phosphor layer may be varied depending on the characteristics of the radiation image storage panel to be prepared, the natures of the phosphor, and the ratio of the binder polymer to the phosphor.

The coating dispersion of the phosphor layer can be coated on a sheet other than the support. For instance, the coating dispersion can be coated on a glass sheet, a metal sheet, a plastic sheet or a sheet of other material. The coated phosphor dispersion is dried to give a phosphor layer and then separated from the sheet. The dried phosphor layer (i.e., phosphor sheet) can be used per se with no support or fixed on the genuine support under pressure, optionally using an adhesive.

On the phosphor layer, a protective film is provided, directly, or via a cushioning layer.

The protective film of the invention comprises a film of plastic material and a coated layer of a resin composition containing a fluororesin.

The film of plastic material is optionally selected from those known as protective films of the radiation image storage panels, for instance, films of polyethylene terephthalate, polyethylene naphthalate, and aramide resin. Other plastic materials also can be employed, provided that the plastic materials have enough strength and high transparency. The thickness of the film of plastic material generally ranges from 1 to 10 μm.

The protective film of the invention is produced by coating the fluororesin-containing resin composition on the film of plastic film. The coating of the fluororesin-containing resin composition on the film of plastic film can be done after the film is placed and fixed on the stimulable phosphor layer by an adhesive layer. Otherwise, the fluororesin-containing resin composition can be coated over the film of plastic material which is placed on a plane surface of an appropriate temporary support such as glass sheet. The film of plastic material which is coated with the fluororesin-containing resin composition is then placed and fixed on the beforehand prepared stimulable phosphor layer using adhesive.

The fluororesin-containing resin composition is coated on the film of plastic material by preparing a solution of a resin composition containing not less than 30 weight % of a fluororesin, coating the solution on the film, and drying thus coated solution layer.

The fluororesin can be a homopolymer of a fluorine atom-containing olefin or a copolymer of a fluorine atom-containing olefin and other monomer. Examples of the fluororesins include polytetrafluoroethylene, polychlorotrifluoroethylene, polyfluorinated vinyl, polyfluorinated vinylidene, tetrafluoroethylene-hexafluoropropylene copolymer, and fluoroolefin-vinyl ether copolymer. Most of the fluororesins are insoluble in organic solvents. However, copolymers of the fluoroolefin and comonomer can be made soluble in a certain organic solvent if an appropriate comonomer is chosen. Therefore, such soluble fluororesins can be dissolved in an appropriate organic solvent to prepare a coating solution. The coating solution of the fluororesin is coated on the cushioning layer and dried to give a coated protective layer of the resin composition containing a fluororesin. Further, if an appropriate fluorine atom-containing organic solvent such as a perfluoro solvent is chosen, polytetrafluoroethylene and its modified polymer can be soluble in the solvent.

The above-mentioned fluororesins is employed in combination with other fluororesins or polymers other than the fluororesins to form the protective layer. However, if the protective layer should have enough anti-staining properties, the layer of the resin composition should contain the fluororesin at least 30 weight %, preferably at least 50 weight %, more preferably not less than 70 weight %.

The layer of the fluororesin-containing resin mixture is preferably crosslinked to increase strength and durability of the protective layer. Accordingly, the protective layer-forming coating solution can further contain a crosslinking agent such as an isocyanate resin and an amino resin (e.g., melamine resin). An anti-yellowing agent can be also incorporated into the coating solution.

An example of the oligomer having polysiloxane skeleton is an oligomer which has dimthylpolysiloxane skeleton and moreover preferably has at least one functional group such as hydroxyl group. The molecular weight (weight average) of the oligomer preferably ranges from 500 to 100,000, more preferably ranges from 1,000 to 100,000 and most preferably ranges from 3,000 to 10,000.

The oligomer having a perfluoroalkyl group (e.g., tetrafluoroethylene group) preferably has at least one functional group such as hydroxyl group. The molecular weight (weight average) preferably ranges 500 to 100,000, more preferably 1,000 to 100,000, and most preferably ranges from 10,000 to 100,000.

If the oligomer having the functional group is used, cross-linking reaction takes place between the oligomer and the fluororesin in the presence of the aforementioned cross-linking agent in the course of the formation of the resin composition layer. By the cross-linking reaction, the oligomer is incorporated into the molecular structure of the fluororesin. Therefore, the oligomer hardly liberates from the cross-linked resin composition layer even in the course of repeated use of the radiation image storage panel or when the surface of the resin composition layer is subjected to cleaning procedure, and effect of the addition of the oligomer into the resin composition layer is kept for a long time of period. For this reason, the use of an oligomer having a functional group such as —OH group is advantageous.

The oligomer is preferably incorporated into the resin composition in an amount of 0.01 to 10 weight %. Most preferred range is 0.1 to 3 weight %.

The resin composition can further contain a particulate resin of perfluorolefin or silicone. The particulate resin of perfluorolefin or silicone preferably has a mean particle size of 0.1 to 10 μm. Most preferred range of the mean particle size is 0.3 to 5 μm. The particulate resin is preferably contained in the resin composition in an amount of 0.5 to 30 weight % per the total weight of the resin composition. Most preferred range is 2 to 20 weight A, particularly 5 to 15 weight %.

The layer of the fluororesin-containing resin composition generally has a thickness in the range of 0.5 to 20 μm, preferably in the range of 1 to 10 μm.

The radiation image storage panel of the invention can be prepared by the above-described process. However, the radiation image storage panel can be modified in the known manners. For instance, one or more layers of constituting the radiation image storage panel can be so colored as to well absorb the stimulating rays and not to absorb the stimulated emission. Such coloring sometimes is effective to increase sharpness of the image obtained by the use of the storage panel. Otherwise, an independent colored layer can be placed in an appropriate position of the storage panel for the same purpose.

Examples embodying the present invention are given below.

EXAMPLE 1

Preparation of Stimulable Phosphor Layer

| Composition | |
|---|---|
| Stimulable phosphor ($BaFBr_{0.9}I_{0.1:Eu}{}^{2+}$) | 200 g |
| Binder: Polyurethane elastomer (Pandex T-5265H (solid), product of Dai-Nippon Ink Chemical Industries Co., Ltd.) | 8.0 g |
| Anti-yellowing agent: Epoxy resin (Epikote 1001 (solid), product of Yuka Shell Epoxy Co., Ltd.) | 2.0 g |

The above composition was placed in methyl ethyl ketone and dispersed by means of a propeller mixer to give a coating dispersion of a viscosity in the range of 25 to 30 PS (at 25° C.) in which the ratio of binder to phosphor was 1/20. The coating dispersion was coated on a polyethylene terephthalate temporary support having silicone release coating. The coated layer was dried at 100° C. for 15 minutes to give a stimulable phosphor sheet having a thickness of 300 μm. Thus obtained phosphor sheet was placed on a polyethylene terephthalate film (PET film, thickness: 300 μm) on its undercoating layer side. The resulting laminate was passed through heating rollers to heat 60° to 70° C. under pressure, to give a stimulable phosphor layer (thickness: 200 μm) on the PET film.

Provision of Protective Film

On the stimulable phosphor layer was placed a transparent polyethylene terephthalate film (PET film, thickness: 6 μm, having a polyester adhesive layer) to face the adhesive layer to the phosphor layer. The resulting laminate was passed through heating rollers to heat 90° to 100° C. under pressure, to fix the PET film on the stimulable phosphor layer.

Coating of Fluororesin-Containing Resin Composition

| Composition | |
|---|---|
| Fluororesin: Fluoroolefin-vinyl ether copolymer (Lumiflon LF-100 (50 wt. % xylene solution), product af Asahi Glass Co., Ltd.) | 50 g |
| Cross-linking agent: Isocyanate resin (Colonate HX (solid content: 100 wt. %), product of Nippon Polyurethane Industries Co., Ltd.) | 5 g |
| Alcohol modified-silicone (having a hydroxyl group (carbinol group) at both ends, X-22-2809 (solid content: 66 wt. %), product of Shin-Etsu Chemical Industries Co. Ltd.) | 0.5 g |

The above composition was placed in methyl ethyl ketone and dissolved to give a coating solution of a viscosity in the range of 0.1 to 0.3 PS (at 25° C.). The coating solution was coated on the PET film fixed on the phosphor layer using a doctor blade. The coated layer was heated at 120° C. for 20 minutes for undergoing cross-linking reaction to give a layer of a fluororesin-containing resin composition (thickness: approx. 5 μm).

Thus, a radiation image storage panel of the invention comprising a support, a undercoating layer, a stimulable phosphor layer, a polyethylene terephthalate film, and a layer of fluororesin-containing composition was prepared.

EXAMPLE 2

A phosphor layer (thickness: 200 μm) was prepared in the same manner as in Example 1.

Separately, a coating solution of the following fluororesin-containing resin composition was prepared.

| Composition | |
|---|---|
| Fluororesin: Fluoroolefin vinyl ether copolymer (Lumiflon LF-504 (40 wt. % xylene solution), product of Asahi Glass Co., Ltd.) | 50 g |
| Cross-linking agent: Isocyanate resin (Olester NP-38-70S (70 wt. % ethyl acetate solution), product of Mitsui-Toatsu Chemical Industries Co., Ltd.) | 10 g |
| Alcohol modified-silicone (having a hydroxyl group (carbinol group) at both ends, X-22-2809 (solid content: 66 wt. %), product of Shin-Etsu Chemical Industries Co., Ltd.) | 0.5 g |

The above composition was placed in methyl ethyl ketone and dissolved to give a coating solution of a viscosity in the range of 0.1 to 0.3 PS (at 25° C.).

The coating solution was coated over a separately prepared transparent polyethylene terephthalate film (PET film, thickness: 5.5 μm, having a polyester adhesive layer) on the side having no adhesive layer, by means of a doctor blade. The coated layer was heated to 120° C. for 20 minutes for undergoing cross-linking reaction to give a layer of a fluororesin-containing resin composition (thickness: approx. 2 μm).

The PET film having thereon the coated layer of fluororesin-containing resin composition was placed on the phosphor layer to face the adhesive layer to the phosphor layer. The resulting laminate was passed through heating rollers to heat 90 to 100° C. under pressure, to fix the PET film on the stimulable phosphor layer.

Thus, a radiation image storage panel of the invention comprising a support, a undercoating layer, a stimulable phosphor layer, a polyethylene terephthalate film, and a layer of fluororesin-containing composition was prepared.

EXAMPLE 3

A phosphor layer (thickness: 200 μm) was prepared in the same manner as in Example 1. On the phosphor layer was laminated a polyethylene terephthalate film in the same manner as in Example 1.

Coating of Fluororesin-Containing Resin Composition

| Composition | |
|---|---|
| Fluororesin: Fluoroolefin-vinyl ether copolymer (Lumiflon LF-100 (50 wt. % xylene solution), product of Asahi Glass Co., Ltd.) | 40 g |

-continued

| Composition | |
|---|---|
| Cross-linking agent: Amino resin (Cymel 303, (solid content: 98 wt. %), product of Mitsui Cyanamide Co., Ltd.) | 5 g |

The above composition was placed in methyl ethyl ketone and dissolved to give a coating solution of a viscosity in the range of 0.1 to 0.3 PS (at 25° C.). The coating solution was coated on the PET film fixed on the phosphor layer using a doctor blade. The coated layer was heated at 140° C. for 30 minutes for undergoing cross-linking reaction to give a layer of a fluororesin-containing resin composition (thickness: approx. 2 μm).

Thus, a radiation image storage panel of the invention comprising a support, a undercoating layer, a stimulable phosphor layer, a polyethylene terephthalate film, and a layer of fluororesin-containing composition was prepared.

COMPARISON EXAMPLE 1

The procedures of Example 1 were repeated except for using a transparent polyethylene terephthalate film (thickness: 11 μm) and placing no layer of fluororesin-containing resin composition, to prepare a radiation image storage panel for comparison comprising a support, a undercoating layer, a stimulable phosphor layer (thickness: 200 μm), and a polyethylene terephthalate protective film.

COMPARISON EXAMPLE 2

The procedures of Example 1 were repeated except for using a transparent polyethylene terephthalate film (thickness: 5.5 μm) and placing no layer of fluororesin-containing resin composition, to prepare a radiation image storage panel for comparison comprising a support, a undercoating layer, a stimulable phosphor layer (thickness: 200 μm), and a polyethylene terephthalate protective film.

COMPARISON EXAMPLE 3

The procedures of Example 1 were repeated except for coating the fluororesin-containing resin composition directly over the phosphor layer using a doctor blade and heating the coated layer at 120° C. for 20 minutes for undergoing cross-linking reaction to give a layer of a fluororesin-containing resin composition (thickness: approx. 10 μm).

Thus, a radiation image storage panel of the invention comprising a support, a undercoating layer, a stimulable phosphor layer, and a layer of fluororesin-containing composition was prepared.

Evaluation of Radiation Image Storage Panel

[Transferring Durability]

The radiation image storage panel prepared in the Examples was cut to give a test sheet of 100 mm×250 mm, which was then transferred on the transfer test machine (which is shown in U.S. Pat. No. 5,227,253). The test sheet was introduced from the entrance to pass through the guide plates and nip rolls (diameter: 25 mm). The test sheet was moved on the conveyor belt to successively bend inward and outward along the rubber rolls (diameter: 40 mm) and then was taken out through guide plates and nip rolls. This transferring procedure was repeated up to 3,000 cycles. The test sheet was then observed for checking production of cracks on the overcoat layer of the test sheet. A test sheet showing no cracks on its overcoat layer was further subjected to the above transferring procedure for additional 7,000 cycles (total: 10,000 cycles), and the observation on the overcoat layer was again performed. The results are given in Table 1.

[Lowering of Sensitivity]

The test sheet having been subjected to the 3,000 cycle transferring procedure was imagewise exposed to X-rays. On the test sheet was irradiated He-Ne laser to read out the recorded image data. From the obtained image data, sensitivity (luminance of stimulated emission) on the area having been brought into contact with the transferring members was calculated, and lowering of sensitivity after the transferring procedure was examined. The results are set forth in Table 1.

TABLE 1

| | Transferring Durability (cracks on protective layer) | Lowering of Sensitivity after 3,000 cycle transferring procedure |
|---|---|---|
| Example 1 | Not observed after 10,000 cycles | 2% |
| Example 2 | Not observed after 10,000 cycles | 1% |
| Example 3 | Not observed after 10,000 cycles | 4% |
| Com. Ex. 1 | Not observed after 10,000 cycles | 23% |
| Com. Ex. 2 | Not observed after 10,000 cycles | 19% |
| Com. Ex. 3 | Observed after 3,000 cycles | 2% |

From the results shown in Table 1, it has been confirmed that the radiation image storage panels of the invention are resistant to staining and abrasion and have satisfactory transferring durability.

What is claimed is:

1. A radiation image storage panel comprising a stimulable phosphor layer and a protective film placed thereon, wherein the protective film comprises a film of plastic material and a layer of fluororesin-containing resin composition coated on the film of plastic material, said coated fluororesin-containing resin composition layer having been prepared by coating on the plastic film of plastic material a solution of a resin composition containing not less than 30 weight % of a fluororesin and drying thus coated solution layer.

2. The radiation image storage panel of claim 1, wherein the resin composition further contains 0.01 to 10 weight % of an oligomer having polysiloxane skeleton or 0.1 to 3 weight % of an oligomer having a perfluoroalkyl group.

3. The radiation image storage panel of claim 1, wherein the resin composition comprises a fluororesin and 0.01 to 10 weight % of an oligomer having polysiloxane skeleton or 0.1 to 3 weight % of an oligomer having a perfluoroalkyl group.

4. The radiation image storage panel of claim 1, wherein the resin composition comprises a fluororesin and 0.01 to 10 weight % of an oligomer having polysiloxane skeleton and at least one hydroxyl group.

5. The radiation image storage panel of claim 1, wherein the resin composition comprises a fluororesin and 0.1 to 3 weight % of an oligomer having a perfluoroalkyl group and at least one hydroxyl group.

6. The radiation image storage panel of claim 1, wherein the coated fluororesin-containing resin composition layer comprises the resin composition which is crosslinked structure.

7. The radiation image storage panel of claim 1, wherein the coated fluororesin-containing resin composition layer comprises the resin composition which is crosslinked via an isocyanate resin.

8. The radiation image storage panel of claim 1, wherein the coated fluororesin-containing resin composition layer comprises the resin composition which is crosslinked via an amino acid.

9. The radiation image storage panel of claim 1, wherein the coated fluororesin-containing resin composition layer comprises the resin composition which is crosslinked via a melamine resin.

10. The radiation image storage panel of claim 1, wherein the film of plastic material comprises polyethylene terephthalate or polyethylene naphthalate.

11. The radiation image storage panel of claim 1, wherein the stimulable phosphor layer is placed on a support sheet.

* * * * *